Oct. 2, 1951     O. MANN     2,569,616

CHUCK

Filed July 20, 1949

*INVENTOR:*
OLIVER MANN
BY Lawrence Burns,
ATTORNEY.

Patented Oct. 2, 1951

2,569,616

UNITED STATES PATENT OFFICE 2,569,616

CHUCK

Oliver Mann, Danvers, Mass., assignor to Sylvania Electric Products Inc., Salem, Mass., a corporation of Massachusetts Application July 20, 1949, Serial No. 105,796

3 Claims. (Cl. 279—75)

This invention relates to article-holding mechanisms and more particularly to chucks for accurately positioning and positively securing an article.

In the manufacture of electric lamps and discharge devices, such as radio tubes and the like, an elongated glass tube, hereinafter referred to as an exhaust tube, is commonly employed to provide a means through which the envelope of the lamp or discharge device may be evacuated. This exhaust tube usually is an integral part of a mount which includes the electrode which is sealed within the lamp or discharge device envelope.

In the sealing operation, i. e., the operation wherein the electrode mount is secured or joined to the envelope, it is necessary that the mount be accurately positioned with reference to the envelope in order to insure proper disposition of the electrode therein upon completion of this operation. This is particularly true with reference to projection lamps which employ electrodes of the filamentary type.

Accordingly, therefore, a particular object of this invention is to provide a mechanism for accurately positioning a lamp mount with reference to the lamp envelope during the sealing operation.

Another object is to provide a means for positioning and securing the exhaust tube of a lamp mount whereby the accurate disposition of the mount with reference to the envelope is insured.

Further objects, advantages and features will be apparent from the following description when read in conjunction with the accompanying drawing in which.

The sealing head chuck of my invention comprises a pair of slides disposed on the sealing head spindle and in register with one another thereon, and two sets of three standard ball-bearing balls disposed in apertures therefor in the spindle and enclosed by their respective slides.

Figure 1:
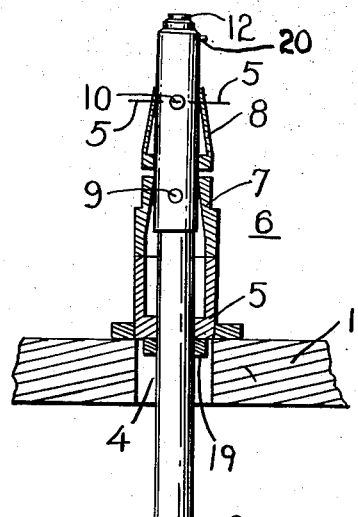
Fig. 1 is a side elevational view partly in section of a sealing head assembly with the chuck thereof in the position of engagement.
Figure 2:
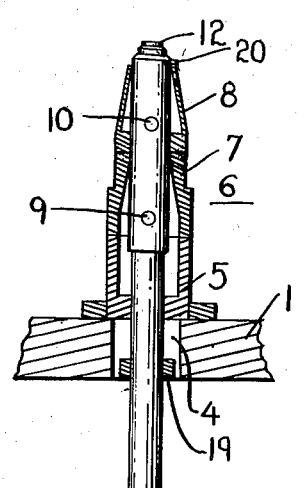
Fig. 2 is a side elevational view partly in section of a sealing head assembly with the chuck thereof in the position of disengagement.

In Figures 1 and 2 the sealing head assembly is mounted on a turret 1, a fragmentary portion of which is shown. The turret 1 is a part of a conventional lamp sealing machine designed to effect the advancement of the lamp mount and lamp envelope past a plurality of stations thereon to accomplish the sealing operation. Actuation of the sealing head, which is effected at certain of these stations, is accomplished by means of a cam track 2, motion being imparted to the head through a spindle 3. The spindle 3 extends through an aperture 4 therefor in the turret 1. A collar 5, which is mounted on the turret 1 and in register with the aperture 4, serves as the base for the chuck 6, of my invention. The chuck 6 comprises a pair of slides 7 and 8, in register with one another, which coact with two sets of three standard ball-bearing balls 9 and 10 disposed in apertures therefor in the spindle 3. The inside faces of slides 7 and 8 are frustro-conical in contour. The upper portion of the spindle 3 is provided with a sleeve 11 which has apertures therein to permit the balls 9 and 10 to engage the inside face of slides 7 and 8.

The top of the spindle 3 is provided with a sealing pin 12 (Figure 3) on which an electrode mount 13 (a portion of which is shown) is seated. That portion of the mount 13 which is shown comprises a flare 14, a stem press 15, electrode-supporting wires 16 and an exhaust tube 17. The exhaust tube 17 is disposed in an opening 18 therefor in the spindle 3.

In Figure 2, the sealing head assembly is shown in the position which it assumes during loading and unloading, i. e., at the start of the sealing operation and at the conclusion thereof. A mount 13 is positioned on the sealing head by threading the exhaust tube 17 thereof into the opening 18 in the spindle 3 until the flare 14 seats itself on the sealing pin 12. The lamp envelope (not shown) to which the mount is to be sealed is securely positioned above the mount with the periphery of the neck of the envelope in engagement with the flare 14. As the sealing head moves from the loading station as shown in Figure 2 to the next station on the sealing machine, the spindle 3 is caused to move upwardly by a rise in the cam track 2. Since the balls 9 and 10 are disposed in the spindle, they move upwardly therewith. The internal taper of the slides 7 and 8 is such that the balls 9 and 10 engage the inside faces thereof and the exhaust tube 17 as the spindle 3 approaches the end of its upward stroke.

A collar 19 is fixedly attached to the spindle 3 to insure a predetermined upper limit of the stroke thereof, thereby protecting the chuck and the exhaust tube 17 from excessive, undersirable forces being exerted thereon. A pin 20, which protrudes from the upper end of the spindle 3, serves as a stop to limit the upward travel of slide 8 on the spindle.

Figure 3:
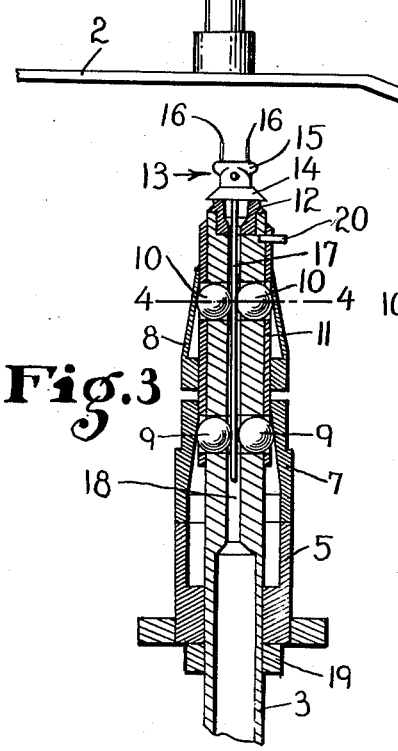
Fig. 3 is a sectional view of the chuck taken along the longitudinal axis thereof, with the exhaust tube in position.
Figures 4, 5:
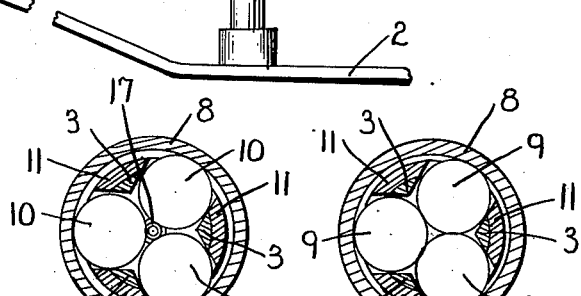
Fig. 4 is a sectional view of the chuck taken along the lines 4—4 of Fig. 3.
Fig. 5 is a sectional view of the chuck taken along the lines 5—5 of Fig. 1.

Figure 3 shows the relative disposition of the several parts of the sealing head assembly after the chuck has engaged the exhaust tube 17. Figures 3 and 4 show how uniform vertical alignment and concentricity is attained and insured. Vertical alignment is obtained by reason of the fact that two sets of three balls in two suitably spaced horizontal planes provide six positive point contacts. Concentricity is assured because all three of the balls in each set thereof are of the same size; they all engage the exhaust tube at substantially the same instant, and with substantially equal forces, since each set of balls is actuated by its own slide. The positive gripping of the exhaust tube, which the chuck of my invention insures, not only provides uniform vertical alignment and concentricity during the initial states of the sealing operation, but it also makes possible working of the molten glass to actually form the seal during the later stages of the sealing cycle.

What I claim is:

1. In an article-holding apparatus, the combination of a spindle having apertures in the side wall thereof and an article-receiving opening therein extending from an end thereof; a pair of independent slides disposed on said spindle and concentric therewith and in register with one another, the inner face of each of said slides being frustro-conical in contour, said slides being moveable vertically on said spindle; and a plurality of balls seated in apertures therefor in said spindle and partially extending into the space defined by the frustro-conical inner face of said slides.

2. A chuck for gripping the exhaust tube of an electric lamp disposed in a spindle therefor, said chuck comprising two sets of balls disposed about the periphery of the spindle in two separate locations along the longitudinal axis thereof; and a pair of independent slides disposed on said spindle and moveable vertically thereon, each of said slides enclosing a set of said balls, the inner face of each of said slides being frustro-conical in contour.

3. In an article-holding apparatus, the combination of a spindle having apertures in the side wall thereof and an elongated article-receiving opening therein extending from an end thereof; a plurality of balls seated in the apertures in said spindle; and a pair of independent slides concentric with said spindle and enclosing said balls, the internal faces of said slides being substantially frustro-conical in contour, said slides being moveable vertically on said spindle.

OLIVER MANN.

REFERENCES CITED

The following references are of record in the file of this patent:

UNITED STATES PATENTS

| Number | Name | Date |
| --- | --- | --- |
| 1,130,716 | Dressel | Mar. 9, 1915 |
| 1,547,706 | Whitmore et al. | July 28, 1925 |